July 3, 1928.
H. S. HOLMES
1,675,706
WHEEL NAVE AND THE LIKE AND METHOD OF FORMING IT
Filed April 21, 1926      2 Sheets-Sheet 1
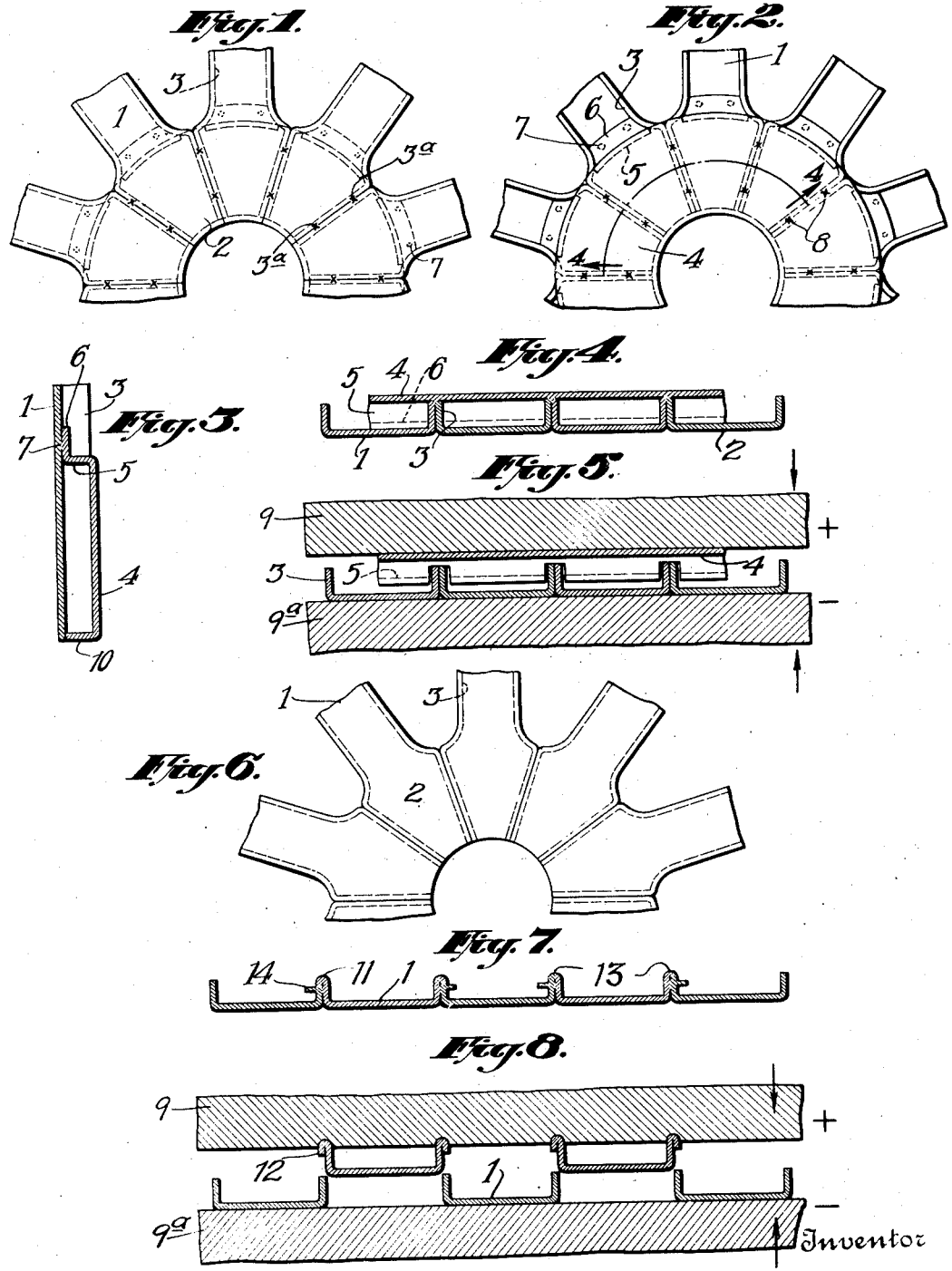
Inventor
HENRY S. HOLMES.
By His Attorney July 3, 1928.
H. S. HOLMES
1,675,706
WHEEL NAVE AND THE LIKE AND METHOD OF FORMING IT
Filed April 21, 1926. 2 Sheets-Sheet 2
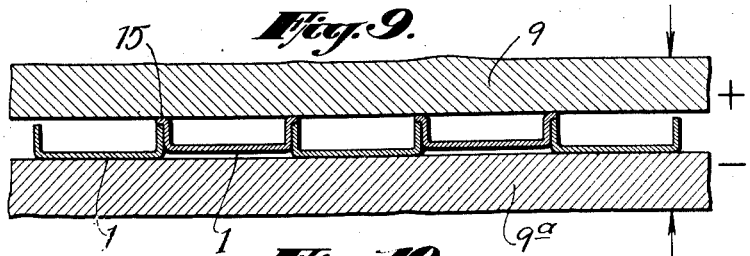
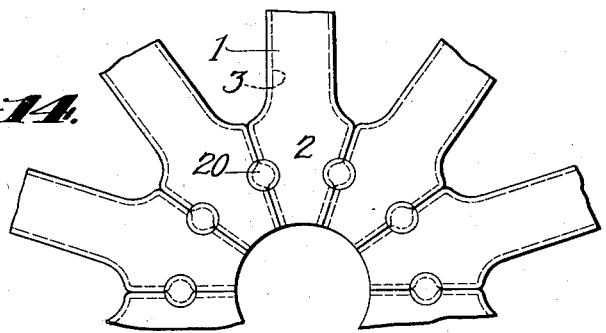
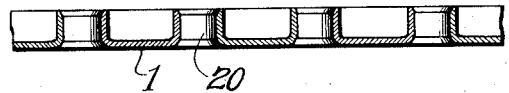
Inventor
HENRY S. HOLMES
By His Attorney
D. Anthony Usina Patented July 3, 1928.

1,675,706

UNITED STATES PATENT OFFICE.

HENRY S. HOLMES, OF NEW YORK, N. Y., ASSIGNOR TO THOMAS E. MURRAY, OF BROOKLYN, NEW YORK.

WHEEL NAVE AND THE LIKE AND METHOD OF FORMING IT.

Application filed April 21, 1926. Serial No. 103,461.

The invention aims to provide an improved wheel nave or similar structure which shall be strong and rigid and a method by which it can be produced economically. The accompanying drawings illustrate embodiments of the invention.

Figs. 1 and 2 are opposite face elevations of a nave;

Fig. 3 is a vertical radial section thereof;

Fig. 4 is a section on the annular line 4—4 of Fig. 2;

Fig. 5 is a similar view illustrating the welding operation;

Fig. 6 is an elevation similar to Fig. 1 showing the nave formed as a single plate;

Fig. 7 is an annular section of the same;

Fig. 8 is a similar view showing the parts in process of being welded;

Fig. 9 is a similar view of another method of production;

Figs. 10, 11, 12, and 13 are annular sections of alternative designs;

Fig. 14 is a face elevation of a modified design; and

Fig. 15 is an annular section of Fig. 14.

In producing metal wheels it is often desirable to unite wedge-shaped ends of the spokes in such a way as to produce substantially a one-piece structure at this point, giving strength and rigidity to the whole wheel. The present invention provides such a nave of radially ribbed section combined, if desired, with a covering plate to produce a box section. The same ideas may be applied to the production of plates of ribbed or box section for other uses.

Fig. 1 illustrates a number of spokes 1 with their wedged-shaped inner ends 2 assembled to form the nave. The spokes are of channel or similar shape with flanges 3 which come together to form radial ribs as shown in dotted lines in Fig. 1. They may be spot-welded together as at 3ª.

A cover plate 4 (Fig. 2) of annular shape overlies the edges of the several ribs and is provided with backwardly turned flanges 5 extending in the axial direction, at the ends of which are transverse flanges 6 bearing against the inner faces of the spokes 1.

The parts being assembled in the positions described, are welded together. For example, they may be spot-welded at the points 7 through the flanges 6 and the spokes, and also spot-welded at points 8 between the plate 4 and the tops of the ribs so as to fasten together the cover plate and also the flanges of the two adjacent spokes.

Figs. 4 and 5 illustrate an alternative method of welding. The spokes 1 have the ribs formed by the flanges 3 butt-welded to the plate 4. Before welding the parts are as in Fig. 5. The successive flanges 5 are practically continuous but with slots into which the ribs 3 project nearly to the point of contact with the plate 4. The parts are pressed together between positive and negative electrodes 9 and 9ª respectively. A current is applied to soften the parts at the points of contact, and is continued while the metal is taken up and the parts welded and brought to the position of Fig. 4. The flange 6 may be omitted from the construction shown in these Figs. 1 to 5. The same is true of the flange 5 though preferably this is retained as well as a flange 10, Fig. 3, around the inner edge of the plate 4, so as to close the space between the two plates. In fact, the flange 10 is unnecessary for a closure in a nave, since this space will be closed by parts of the hub.

Fig. 6 illustrates a nave formed only of the ends of the spokes 1. The parts may be shaped and assembled in a variety of ways.

Fig. 7 shows the inner ends united by welding to form ribs 11. For this purpose, as shown in Fig. 8, the alternate spokes are provided with extra long flanges bent over as at 12 to abut against the edges of the flanges on the intermediate spokes. The parts are pressed together between electrodes 9 and 9ª and welded on the ends and at their sides as at 13. The flash or extruded metal indicated at 14 may be cut away for the sake of appearance.

Fig. 9 illustrates a slight variation in which the edges of the alternate spokes are bent over as at 15 to bring their faces against the edges of the adjacent flanges. The take up movement brings the flat portions of the spokes into a common plane, producing a structure substantially like Fig. 7.

According to Fig. 10, the spokes 1 have simple flanges alongside of each other and are spot-welded together as at 16.

The design of Fig. 11 is similar except that the spot-welds 17 are at the edges of the flanges.

According to Fig. 12, one set of flanges 18 is made extra long, bent over the adjacent flange and down on to the plate of the next spoke 1 and spot-welded thereto as at 19. Or it may be fastened by simply bending it over the adjacent flange, as at 18, Fig. 13, with or without welding of the flanges together.

According to Figs. 14 and 15, the flanged edges of the wedge ends 2 are provided with semicircular recesses in which are located rivets 20 which hold the parts together.

Any of the single plate structures shown in Figs. 6 to 15 may be combined with the cover plates described in connection with Figs. 1 to 5.

The process described may be advantageously applied not only to the production of wheel naves but to the production of various other articles consisting of a number of members united with their bodies or principal portions in a common plane with flanges between. In this connection, the bending over of some of the flanges to bring them into a butt or edge engagement with the adjacent member or flange is particularly useful in permitting the making of a strong butt-joint.

Various modifications of the embodiments shown and described may be made by those skilled in the art without departing from the invention as stated in the following claims.

What I claim is:—

1. A wheel nave which is removably applicable to a hub composed of radial members with flanges on their longitudinal edges, in combination with an annular plate covering the edges of said flanges and welded to said radial members.

2. A wheel nave composed of radial members with flanges on their longitudinal edges, in combination with a plate covering the edges of said flanges and having flanges extending axially and welded to said members.

3. A wheel nave composed of radial members with flanges on their longitudinal edges, in combination with a plate covering the edges of said flanges and having portions lying against the portions of said members between the flanges and welded thereto.

4. A wheel nave which is removably applicable to a hub composed of radial members united to one another and having flanges on their longitudinal edges, in combination with an annular plate covering the edges of said flanges and united to said radial members.

5. A wheel nave composed of radial members having flanges on their longitudinal edges, the faces of each pair of adjacent flanges being in contact and one flange being bent over and welded to the other.

6. A wheel nave comprising radial members having flanges on their longitudinal edges, the faces of the adjacent flanges being in contact and the members being united to each other by a butt-weld on the edges of such flanges.

7. The method of producing a wheel nave, which consists in forming radial members with flanges on their longitudinal edges shaped to form a butt-joint, between members in the same transverse plane and butt-welding the parts together.

8. The method of uniting flanged sheet-metal parts lying in substantially the same plane, which consists in shaping such flanges to provide a butt-joint at the edge, and butt-welding the parts at such edge.

In witness whereof, I have hereunto signed my name.

HENRY S. HOLMES.